(12) United States Patent
Tulskie et al.

(10) Patent No.: US 8,341,345 B2
(45) Date of Patent: Dec. 25, 2012

(54) SYSTEM AND METHOD FOR PROVIDING CONTENT BASED ANTICIPATIVE STORAGE MANAGEMENT

(75) Inventors: William A. Tulskie, Scrub Oak, NY (US); Vamsi K. Vutukuru, Fairfax, VA (US)

(73) Assignee: International Business Machines Corporation, Armonk, NY (US)

( * ) Notice: Subject to any disclaimer, the term of this patent is extended or adjusted under 35 U.S.C. 154(b) by 1262 days.

(21) Appl. No.: 11/199,456

(22) Filed: Aug. 8, 2005

(65) Prior Publication Data

US 2007/0033340 A1    Feb. 8, 2007

(51) Int. Cl.
*G06F 12/00* (2006.01)
*G06F 13/00* (2006.01)

(52) U.S. Cl. ......... 711/108; 711/100; 711/154; 711/200

(58) Field of Classification Search .................. 711/108, 711/100, 154, 200
See application file for complete search history.

(56) References Cited

U.S. PATENT DOCUMENTS

| | | | | |
|---|---|---|---|---|
| 5,475,835 | A | * | 12/1995 | Hickey ............................ 725/109 |
| 5,754,766 | A | * | 5/1998 | Shaw et al. .................... 709/200 |
| 5,822,780 | A | | 10/1998 | Schutzman |
| 6,226,618 | B1 | * | 5/2001 | Downs et al. .................... 705/51 |
| 6,269,382 | B1 | | 7/2001 | Cabrera et al. |
| 6,604,116 | B1 | | 8/2003 | Gupta |
| 6,807,605 | B2 | | 10/2004 | Umberger et al. |
| 7,092,977 | B2 | * | 8/2006 | Leung et al. .................... 707/205 |
| 2004/0039728 | A1 | * | 2/2004 | Fenlon et al. ....................... 707/1 |
| 2005/0203940 | A1 | * | 9/2005 | Farrar et al. .................... 707/102 |

FOREIGN PATENT DOCUMENTS

| JP | 08-263335 | 10/1996 |
|---|---|---|
| JP | 2000-293599 | 10/2000 |

OTHER PUBLICATIONS

Giampaolo, Dominic, "Practical File System Design with the Be File System", 1999, Morgan Kaufman Publishers, Inc., 1st Edition, pp. 59-98.*

Wang, M. et al., "Storage Device Performance Prediction with CART Models," Proceedings of the IEEE Computer Societys $12^{th}$ Annual International Symposium on Modeling, Analysis, and Simulation of Computer and Telecommunication Systems (Mascots 2004), Oct. 4-8, 2004, pp. 588-595.

* cited by examiner

*Primary Examiner* — Tuan V. Thai
(74) *Attorney, Agent, or Firm* — Andrea Bauer; Hoffman Warnick LLC

(57) ABSTRACT

A hierarchical storage management (HSM) system and method. A system is provided comprising: a data usage monitor for extracting data object information from data objects in a hierarchical storage complex that is managed by a content management system; a data relationship repository for storing data object information, wherein the data object information includes relationship data for data objects in the hierarchical storage complex; and a system that analyzes the relationship data and makes data management action recommendations for the hierarchical storage complex.

21 Claims, 2 Drawing Sheets

SYSTEM AND METHOD FOR PROVIDING CONTENT BASED ANTICIPATIVE STORAGE MANAGEMENT

BACKGROUND OF THE INVENTION

1. Technical Field

The present invention relates generally to storage management, and more specifically relates to a system and method for providing content based anticipative storage management.

2. Related Art

Hierarchical Storage Management (HSM) is now considered a mandatory minimum capability for virtually all archival systems. Current HSM systems are driven by explicitly stated rule based policies that are derived from low level attributes like age, size, frequency of usage or some user assigned file priority.

The simplistic rules that typically govern the movement of data from expensive media such as disk to cheaper slower media such as tape do not support intelligent, proactive data migration based on a comprehensive consideration of data attributes, content, and interrelationships. Consequently, hierarchical storage space is sub-optimally managed and system performance is diminished.

Current HSM systems solve the problem of archival and space management by providing the ability to set explicit policies based on low level file attributes. TSM HSM™ and LEGATO DiskExtender™ are some systems that offer these capabilities. These systems use very simplistic means to determine data that are candidates for archival. Likewise, data recall operations are typically triggered by specific user requests.

The simplistic attributes employed by current state-of-art hierarchical storage management tools do not address the current sophisticated requirements of data migration (archival and recall) across a hierarchically arranged set of storage systems. Ironically, archival operations generally ignore readily available and important information describing relationships among data objects submitted to archives. Likewise, recall operations do not anticipate recalls of data objects that are likely to be needed by users. Consequently, data migrations (recalls and secondary archival) do not perform as well as is possible with more sophisticated rules, policies, and information.

Current HSM systems are based on low level attributes like file size, age, frequency of usage etc. Hence, the HSM policies are constrained to work on a limited set of attributes. This is of limited use in complicated storage scenarios where the users are interested in migrating files based on the content, rather than just file size, etc. Users do not have the flexibility to set higher level policies for migration across the storage hierarchy like: "Migrate all the files related to drug trials conducted before 1998 and which mention compounds X, Y and Z to tape storage," or "Migrate all files which refer to project number 1S23 to cheaper SATA disks," or "Migrate all medical records and related documents for patients who have been discharged." Similarly, current HSM systems cannot handle more complex policies such as: "Migrate all files that satisfy X, to storage media Y," where X can be a standard SQL predicate or condition and Y is a type of storage media with a defined cost and performance, perhaps as part of a storage pool.

These types of policies cannot be supported by the existing HSM systems because such systems are severely limited by the number and nature of the policy attributes. In addition, the storage attributes are relatively limited—particularly with regard to performance and cost characteristics of the storage media and therefore the potential service level afforded by the media in question.

Current HSM systems are driven by explicitly defined rules "If X, then Y," which are dependent on the policy attributes (data object and storage media). However, current systems storage scenarios are more complex. Users cannot always define all the possible rules. Ideally, HSM system should also be governed by a set of implicit rules. For example, users may always migrate a particular set of hospital bills and medical records at the same time. It is quite possible that there is an implicit relationship between the set of object classes involving hospital bills and medical records, e.g., they might belong to a particular patient who has been discharged. So if there is an explicit HSM policy to transfer all hospital bills of a patient who has been discharged, then it makes sense to migrate the medical records of the patient also.

Similarly, if a patient's medical records are being pulled up from tape storage, then it may be a good idea to also pull up the hospital bills. An insurance agent who is looking at the medical records may also want to check the hospital bills. Instead of issuing two separate explicit data migration commands, it would be preferable if the records were automatically pulled up in one single command, thereby reducing the tape latency. These types of rules cannot be implemented with current HSM systems.

SUMMARY OF THE INVENTION

The present invention addresses the above-mentioned problems, as well as others, by providing a system and method for identifying and tracking information pertinent to data archival and recall, and employing this information codified as rules, policies, and data relationships within a mechanism to improve performance of data archival systems. The invention includes mechanisms for capturing explicit or implicit data relationships through system monitoring and user input. The invention also includes mechanisms for processing of the data relationships with algorithms to produce recommendations for improved allocation and usage of storage space.

In a first aspect, the invention provides a hierarchical storage management (HSM) system, comprising: a data usage monitor for extracting data object information from data objects in a hierarchical storage complex that is managed by a content management system; a data relationship repository for storing data object information, wherein the data object information includes relationship data for data objects in the hierarchical storage complex; and a system that analyzes the relationship data and makes data management action recommendations for the hierarchical storage complex.

In a second aspect, the invention provides a program product stored on a computer readable medium for managing data object relationships in a storage management system, comprising: program code configured for extracting data object information from data objects in a storage complex that is managed by a content management system; a data relationship repository for storing data object information, wherein the data object information includes relationship data for data objects in the storage complex; and program code configured for analyzing the relationship data and creating data management action recommendations for the storage complex.

In a third aspect, the invention provides a method for providing anticipative storage management for data objects in a storage complex, comprising: analyzing data objects to generate content information; storing the content information in a relationship repository that identifies objects having similar content information; and creating recommended storage management actions based on relationships identified in the relationship repository.

In a fourth aspect, the invention provides a method for deploying an anticipative storage management application for managing data objects in a storage complex, comprising: providing a computer infrastructure being operable to: extract data object information from data objects in the storage complex; store data object information, wherein the data object information includes relationship data for data objects in the storage complex; and analyze the relationship data and create data management action recommendations for the storage complex.

In a fifth aspect, the invention provides computer software for implementing an anticipative storage management application for managing data objects in a storage complex, the computer software comprising instructions to cause a computer to perform the following functions: extract data object information from data objects in the storage complex; store data object information, wherein the data object information includes relationship data for data objects in the storage complex; and analyze the relationship data and create data management action recommendations for the storage complex.

In accordance with the above, the present invention provides various storage management features including allowing for predictive archival and recall operations; allowing for rules/policy based governance of predictive migration staging space; and allowing for improved response time to users for archival and recall operations

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
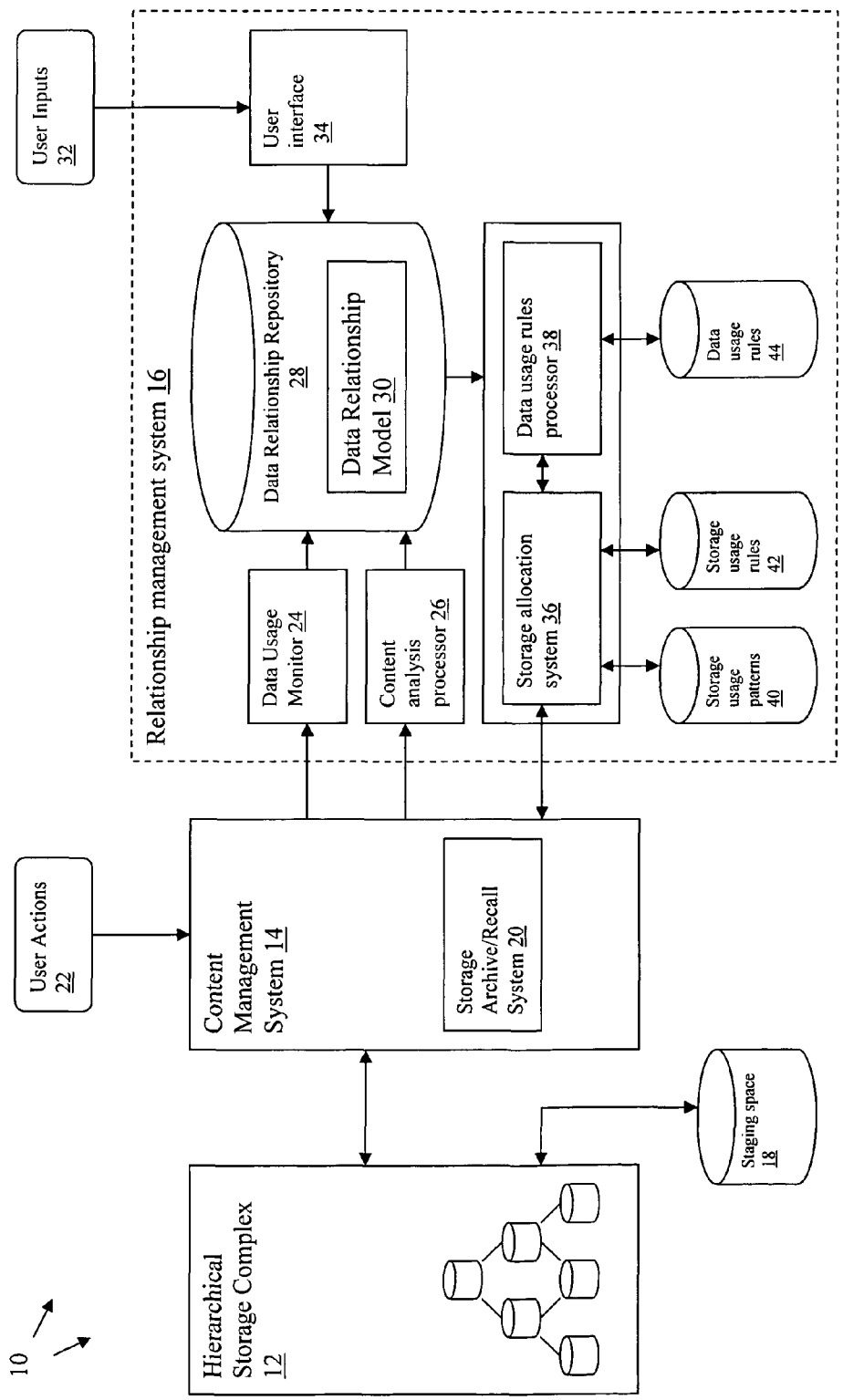
FIG. 1 depicts a hierarchical storage management system in accordance with an embodiment of the present invention.

Referring now to the drawings, FIG. 1 depicts a hierarchical storage management (HSM) system 10 that generally includes a hierarchical storage complex 12, a content management system 14, and a data relationship management system 16. Hierarchical storage complex 12 may include various types of storage mechanisms, e.g., hard drive, tape, disk, optical, etc., for storing data objects. For the purposes of this invention HSM system 10 may comprise any type of storage management system in which data objects may be moved from one storage mechanism to another.

A data object may comprise any piece of data that is managed as a single element by the HSM system 10. Typically, each file is considered a separate object; however, a set of files may also be considered a data object. The specifications for the HSM system 10 will determine whether individual files, set of files, or both are managed (i.e., archived, recalled, migrated) across its storage hierarchy. Thus, the invention operates on data objects that can be individual files, set of files, or both.

Content management system 14 comprises a typical system for managing content in an enterprise, which can range from a very low level system where all the files are simply stored in a file system or a more sophisticated system where data is stored in a database with metadata describing each particular data object. Content management system 14 responds to any actions 22 that relate to the data objects in hierarchical storage complex 12. These actions may include, e.g., opening/editing files, requests to recall archived data objects, etc.

As noted, content may be stored along with metadata. Depending on the type of the content management system 14, the metadata may comprise low level attributes such as file size, age, frequency of usage, etc., or comprise high level attributes such as a description of the file contents, e.g., patient number, disease name, prescription details etc., for an electronic medical record. Content management system 14 has the ability to access data objects along with the associated metadata.

Included with content management system 14 is a storage archive/recall (SAR) system 20. The SAR system 20 can be an independent system that interoperates with the content management system 14 or it can be fully integrated with the content management system 14. The SAR system 20 keeps track of all the storage components. It has information on the type of storage (e.g., tape, disk, optical, etc.), the costs associated with each storage type (e.g., the price of the storage media and retrieval times associated with pulling data from the storage), the capacity of each storage subtype, amount of storage used in each subtype, user defined thresholds that specify the maximum amount of storage usage permitted before data needs to be migrated to "cheaper" media, the access patterns of each data files in the storage (e.g., keeping track of objects that are moved simultaneously).

Data relationship management system 16 analyzes and identifies relationships and other information regarding the manner in which data objects are utilized in order to optimize storage archiving and retrieval actions taken by the content management system 14. Central to the data relationship management system 16 is a data relationship repository 28, which organizes data according to a data relationship model 30. The data relationship repository 28 contains information about each uniquely identified data object. It also contains all information regarding the relationships among data objects. The data relationship model 30 provides a structure for organizing the data object information. A set of data usage rules 44 can be applied to the structured information to manage the storage and retrieval of data objects within the hierarchical storage complex 12. The model 30 includes three types of data: data object descriptors, data access descriptors and data relationship descriptors.

Data object descriptors include unique identifiers for each data object, descriptive information for each data object including the size (e.g., in bytes or some other metric), and type of data. The data object descriptors may also include content information (e.g., metadata or actual data content) related to the particular data object. Data access descriptors describe the data access events and include for each event the user identifier, time and date, a unique identifier for data accessed, and type of access (read, read/write, etc.). Data relationship descriptors describe the relationships among data objects. A data relationship generally includes: a list of two or more related data objects, the relationship type, the frequency with which each object appears as part of the set, and the "usage" for the relationship. The relationship type refers to how the data objects are related, e.g., both contain similar content information, both are typically opened by users simultaneously, etc. The "usage" identifies a type of content management action (e.g., migrate, archive, or recall) to which the relationship applies.

Information flows into the data relationship repository 28 via a data usage monitor 24, a content analysis processor 26, or a user interface 34. The data usage monitor 24 receives information regarding access to data occurring within the storage management system 10. Typically, this information would be sent from a component within the content management system 14 and would include a unique user identifier, time and date of access, a unique identifier for data accessed, the size (e.g., in bytes or some other metric) and type of data, and type of access (e.g., read, read/write, etc.). Optionally, the content management component may provide a unique access event identifier and a set of related previous access event identifiers. The data usage monitor 24 processes this information to create data object descriptor information, including any data relationships pertinent to archival and recall processes and to migration within the storage hierarchy.

The content analysis processor (CAP) 26 takes data objects and the associated metadata information from the content management system 14 to create content information for each data object. This content information is the union of the metadata associated with the object and the content attributes extracted from the object. The CAP 26 thus enriches the data object descriptors with the content information. Note that the implementation of CAP 26 is dependent on the type of the data objects to be processed and the particular domain. For example, a CAP 26 for image data could be implemented to process a broad range of image formats including JPEG, GIF, TIFF, PNG, etc. CAP 26 could for example have image processing subroutines to extract color and texture based features. Similarly, a CAP 26 for drug trial data should be able to support the various drug trial formats created by various trial management applications, and should be able to extract header and content information, such as patient name, disease type etc.

Content attributes are characteristics that can be extracted from the data object content and that provide classification information useful in determining appropriate data management actions. Note that the metadata information in the content management system 14 can contain content attributes. Examples include: column headers in spreadsheets indicating dates and financial data types; color, texture, layout information of images; contents of DICOM header information present in a DICOM image, etc.

The user interface 34 provides mechanism to enable users to provide user inputs 32 that describe relationships among the data that they use. The user interface 34 translates the relationships as described by users into the format prescribed by the data relationship model 30, and stores the relationship information as part of the data relationship descriptors in the data relationship repository 28.

Once the data relationship repository 28 is loaded with data object information according to the data relationship model 30, data usage rules processor 38 can apply data usage rules 44 to the information to create recommended data management actions. A recommended data management action may for instance comprise a list of data objects, an action (e.g., migrate, recall, archive), a time for which the recommendation is valid, a probability and/or a prioritization. The data usage rules 44 may be applied in response to certain actions occurring in the content management system 14, e.g., a user request to retrieve a file from a tape backup may trigger a rule to look for all data relationships in the data relationship repository 28. Note that the recommended data management action may include a probability attached to it. For instance, the action may state that when file X is retrieved, there is an N % probability that file Y is also retrieved.

The storage allocation system 36 prioritizes the recommended data management actions from the data usage rules processor 38 and creates a set of storage management actions for the content management system 14. The set of storage management actions are based on a set of configurable storage usage rules 42 and prior storage usage patterns 40. Storage usage rules 42 describe the circumstances for which the storage management actions are disallowed, allowed, and recommended. A storage usage rule comprises a type (disallow, allow, recommend), a set of storage management actions (migrate, recall, archive), and conditions (storage residency thresholds/ceilings, executable time periods). Storage usage patterns 40 describe the movements of data across the various levels of the hierarchical storage complex 12 over time.

As noted, the hierarchical storage complex 12 consists of the physical storage media. It can consist of different storage levels associated with different storage types. Each storage level is a group of storage media that have similar price costs and access costs. For example, all tape media belong to one storage level, and all high speed magnetic disks belong to another storage level. The price cost (PC) is the cost price of storage media, i.e., the price cost of tape storage is much less than disk storage. The access cost (AC) is the time required to access a unit of storage on the storage media. For example, access cost of tape storage is much higher than disk storage.

In one illustrative embodiment, hierarchical storage complex may be set up where the storage levels are numbered from 1 to MaxLevel, where MaxLevel is the total number of storage levels present. StorageLevel(1) consists of storage media that have the highest PC and least AC. StorageLevel (MaxLevel) consists of storage media that have least PC and highest AC.

Staging space 18 is a part of the hierarchical storage complex 12 that can be implemented to handle probability-based storage management recommendations from the storage allocation system 36. For each storage level n ($1<=n<MaxLevel$) there is an associated storage component marked as Staging (n). A certain portion of StorageLevel(n) is marked as Staging (n). When data is to be moved based on probabilistic rules ($0<probability<1$) it is first moved into the staging area 18. Thus, if data is to be moved from StorageLevel(n) to StorageLevel(n−1) on an anticipated recall rule, it is first moved into the Staging(n−1). This ensures that data is at the higher storage level when the actual recall command is given. Correspondingly, if data is to be moved from StorageLevel(n) to StorageLevel(n+1) based on a probabilistic rule, it is first moved into Staging(n+1).

Figure 2:
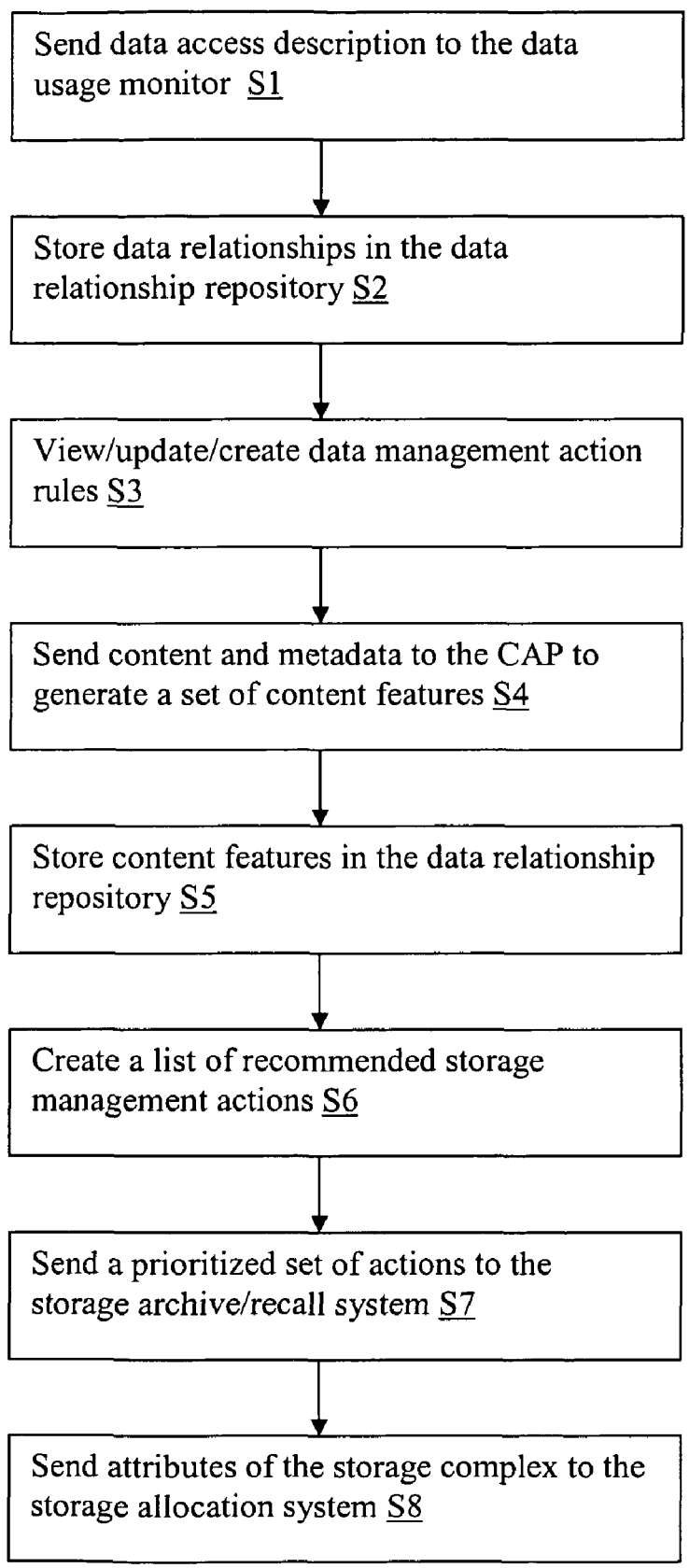
FIG. 2 depicts a flow chart showing an illustrative operation in accordance with an embodiment of the present invention.

Referring now to FIG. 2, an illustrative implementation of the operation of the storage system 10 is depicted in a flow diagram. First, at step S1, content management system 14 send data access a description to the data usage monitor when a user accesses data under the control of the content management system 14. This description includes a unique user identifier, time and date, a unique identifier for data accessed, the size (e.g., in bytes or some other metric) and type of data, and type of access (read, read/write, etc). Optionally, the content management system 14 may provide a unique access event identifier and a set of related previous access event identifiers. The data usage monitor 24 processes this information to create a set of data relationships pertinent to archival, recall, and migration within the storage hierarchy. The data relationships indicate data objects accessed simultaneously by the same user with an indicator for frequency of simultaneous access.

Next, at step S2, the data usage monitor 24 stores the data relationships in the data relationship repository 28. At step S3, users can view and update existing data management action rules and they can add new rules through a user interface. Rules can be entered directly or the user can provide the information to create the rule through a set of prompts provided in the user interface. The data usage rules are created by the user interface 34.

At step S3, the content management system 14 sends content and metadata associated with the content to the content analysis processor (CAP) 26. The metadata may include an explicit data type such as that defined by MIME or the content format may be self defined (such as through a file header). In some cases, the data format may be undefined. The content analysis processor 26 generates content information based on metadata and the content, if the content is in a format that can be processed by the CAP. Otherwise, only the metadata is used to produce the content information. At step S4, the content information is filed in the data relationship repository 28 as part of the data descriptors for the data object being processed.

At step S5, the data usage rules processor 38 and storage allocation system 36 create a list of recommended storage management actions. This process can be invoked on a scheduled basis or based on an external signal such as a prompt from the data usage monitor 24 which reacts to the availability of new space, or the available space usage reaching a preset threshold. The data usage rules processor 38 accesses and scans the data relationship repository 28 identifying data objects for which there is a high likelihood that a data object management action is expected. For example, if the data usage monitor 24 indicates that a second data object has just been recalled from an archive by a given user and the data relationships for that data object indicate that another data object is usually accessed simultaneously, then the data usage rules processor 38 will generate a recommendation that the content management system 14 also recall the second related data object. The recommended data management action will be passed to the storage allocation system 36 to be prioritized and forwarded to the content management system 14.

At step S6, the storage allocation system sends a prioritized set of actions to the storage archive/recall system 20, which executes the actions, e.g., migrating specified data between different StorageLevels and StagingSpaces as required.

At step S7, the storage archive/recall system 20 sends the list of all the attributes of the hierarchical storage complex 12 to the storage allocation system 36. This list of attributes comprises: type of storage (tape, disk, optical, etc,), various storage levels present, the costs associated with each storage level (both PC and AC), total capacity of each storage level, amount of storage being used in each level, user defined thresholds that specify the maximum amount of storage usage permitted before data needs to be migrated, the access patterns of data files in the storage (e.g., how frequently are they being used, keeping track of objects that are moved simultaneously, etc.) etc.

In general, the various components described above may be implemented on a computer system, e.g., a desktop, a laptop, a workstation, etc., which may be implemented as part of a client and/or a server. Access to the computer system may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Connectivity could be provided by message-based protocol such as JMS or self-discovered or other service based protocol such as Web Services. Further, as indicated above, communication could occur in a client-server or server-server environment.

It should be appreciated that the teachings of the present invention could be offered as a business method on a subscription or fee basis. For example, a computer system comprising a relationship management system 16 could be created, maintained and/or deployed by a service provider that offers the functions described herein for customers. That is, a service provider could offer to provide an interface to a content management system that provide recommended data management actions as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A hierarchical storage management (HSM) system, comprising a processor, and a memory, the memory including:
    a data usage monitor, said monitor extracting and capturing data object information from data objects in a hierarchical storage complex that is managed by a content management system; wherein the data object information includes relationship data for data objects in the hierarchical storage complex, and wherein the relationship data describes how the data objects are related and includes sets of related objects, a relationship type for each set of related objects, a frequency at which each set of objects relate, and a content management action for each set of related objects, wherein the relationship type includes at least one of whether the data objects contain similar content information or whether the data objects are typically opened by a user simultaneously;
a data relationship repository, said repository storing the data object information according to a data relationship model; and
a system that analyzes the relationship data and makes data management action recommendations for the hierarchical storage complex.

2. The HSM system of claim 1, wherein the data object information comprises: data object descriptors, data access descriptors, and data relationship descriptors.

3. The HSM system of claim 1, further comprising a content analysis processor that analyzes content attributes and metadata for data objects and generates content information that is stored with the data object information in the data relationship repository.

4. The HSM system of claim 1, further comprising a user interface that allows a user to input relationship data into the data relationship repository.

5. The HSM system of claim 1, further comprising a storage allocation system that prioritizes data management action recommendations for the content management system.

6. The HSM system of claim 5, wherein the storage allocation system prioritizes data management action recommendations based on storage usage rules and storage usage patterns.

7. The HSM system of claim 1, wherein the hierarchical storage complex includes a staging space for data objects being moved between hierarchical levels.

8. The HSM system of claim 1, wherein the content management action is selected from the group consisting of: migrate, archive and recall.

9. A program product stored on a computer readable storage medium for managing data object relationships in a storage management system, comprising:
program code configured for capturing and extracting data object information from data objects in a storage complex that is managed by a content management system, wherein the data object information includes relationship data for data objects in the storage complex, and wherein the relationship data describes how the data objects are related and includes sets of related objects, a relationship type for each set of related objects, a frequency at which each set of objects relate, and a content management action for each set of related objects; wherein the relationship type includes at least one of whether the data objects contain similar content information or whether the data objects are typically opened by a user simultaneously;
a data relationship repository for storing the data object information according to a data relationship model; and
program code configured for analyzing the relationship data and creating data management action recommendations for the storage complex.

10. The program product of claim 9, wherein the data object information comprises: data object descriptors, data access descriptors, and data relationship descriptors.

11. The program product of claim 9, further comprising program code configured for analyzing content attributes and metadata for data objects and generating content information that is stored with the data object information in the data relationship repository.

12. The program product of claim 9, further comprising a user interface that allows a user to input relationship data into the data relationship repository.

13. The program product of claim 9, further comprising program code configured for prioritizing data management action recommendations for the content management system.

14. The program product of claim 13, wherein the data management action recommendations are prioritized based on storage usage rules and storage usage patterns.

15. The program product of claim 9, wherein the storage complex includes a staging space for data objects being moved between storage levels.

16. The program product of claim 9, wherein the content management action is selected from the group consisting of: migrate, archive and recall.

17. A method for providing anticipative storage management for data objects in a storage complex, comprising:
analyzing data objects to capture and generate content information; wherein the content information includes relationship data for data objects in the storage complex, and wherein the relationship data describes how the data objects are related and includes sets of related objects, a relationship type for each set of related objects, a frequency at which each set of objects relate, and a content management action for each set of related objects; wherein the relationship type includes at least one of whether the data objects contain similar content information or whether the data objects are typically opened by a user simultaneously;
storing the content information in a relationship repository according to a data relationship model that identifies objects having similar content information;
creating recommended storage management actions based on relationships identified in the relationship repository.

18. The method of claim 17, comprising the further step of prioritizing the recommended storage management actions.

19. The method of claim 17, wherein the content information comprises content features and metadata.

20. The method of claim 17, wherein the recommended storage management actions include actions selected from the group consisting of: migrate, archive, and recall.

21. A method for deploying an anticipative storage management application for managing data objects in a storage complex, comprising:
providing a computer infrastructure being operable to:
extract and capture data object information from data objects in the storage complex, wherein the data object information includes relationship data for data objects in the storage complex, and wherein the relationship data describes how the data objects are related and includes sets of related objects, a relationship type for each set of related objects, a frequency at which each set of objects relate, and a content management action for each set of related objects; wherein the relationship type includes at least one of whether the data objects contain similar content information or whether the data objects are typically opened by a user simultaneously;
store the data object information in a data relationship repository according to a data relationship model; and
analyze the relationship data and create data management action recommendations for the storage complex.

* * * * *